United States Patent

[11] 3,613,839

| [72] | Inventor | Stanley I. MacDuff<br>South Bend, Ind. |
|------|----------|---------------------------------------|
| [21] | Appl. No. | 789,050 |
| [22] | Filed | Dec. 31, 1968 |
| [45] | Patented | Oct. 19, 1971 |
| [73] | Assignee | The Bendix Corporation |

[54] VEHICLE BRAKE SYSTEM
10 Claims, 4 Drawing Figs.

[52] U.S. Cl. ........................................ 188/170,
188/72.3
[51] Int. Cl. ........................................ F16d 65/24,
F16d 55/22
[50] Field of Search .......................... 188/22, 3,
170; 303/9

[56] References Cited
UNITED STATES PATENTS

| 2,809,723 | 10/1957 | Howze | 188/170 X |
| 3,033,325 | 5/1962 | Jerstrom | 188/170 |
| 3,090,359 | 5/1963 | Hoppenstand | 188/170 X |
| 3,280,933 | 10/1966 | Jones | 188/170 X |
| 3,020,094 | 2/1962 | Murty et al. | 303/9 |

FOREIGN PATENTS

| 1,361,471 | 4/1964 | France | 188/170 |

Primary Examiner—Duane A. Reger
Attorneys—Richard G. Geib and Plante, Arens, Hartz, Hix and Smith ABSTRACT: A disc brake is disclosed which includes a housing defining a bore therewithin which is divided into two compartments by an annular wall. A first piston is slidably mounted in one of the compartments and is adapted to urge a friction member against a rotor upon a brake application. A second piston is mounted in the other compartment. Resilient means yieldably urge the second piston into engagement with the first piston and thereafter urge the first and second piston as a unit toward the rotor. The resilient means is normally opposed by fluid pressure to permit the first piston to apply the brakes of the vehicle when the latter is in motion and the vehicle hydraulic system is functioning normally.

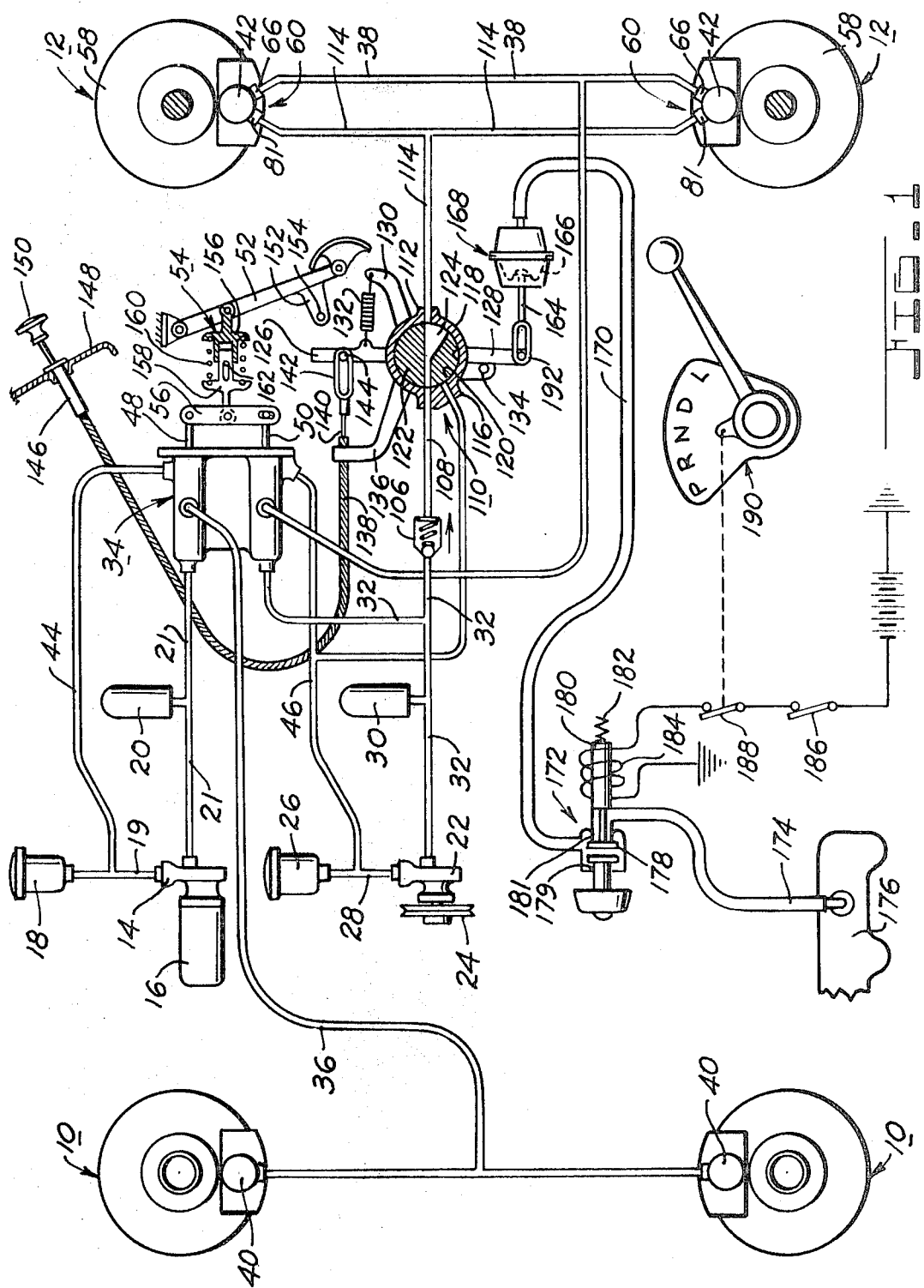

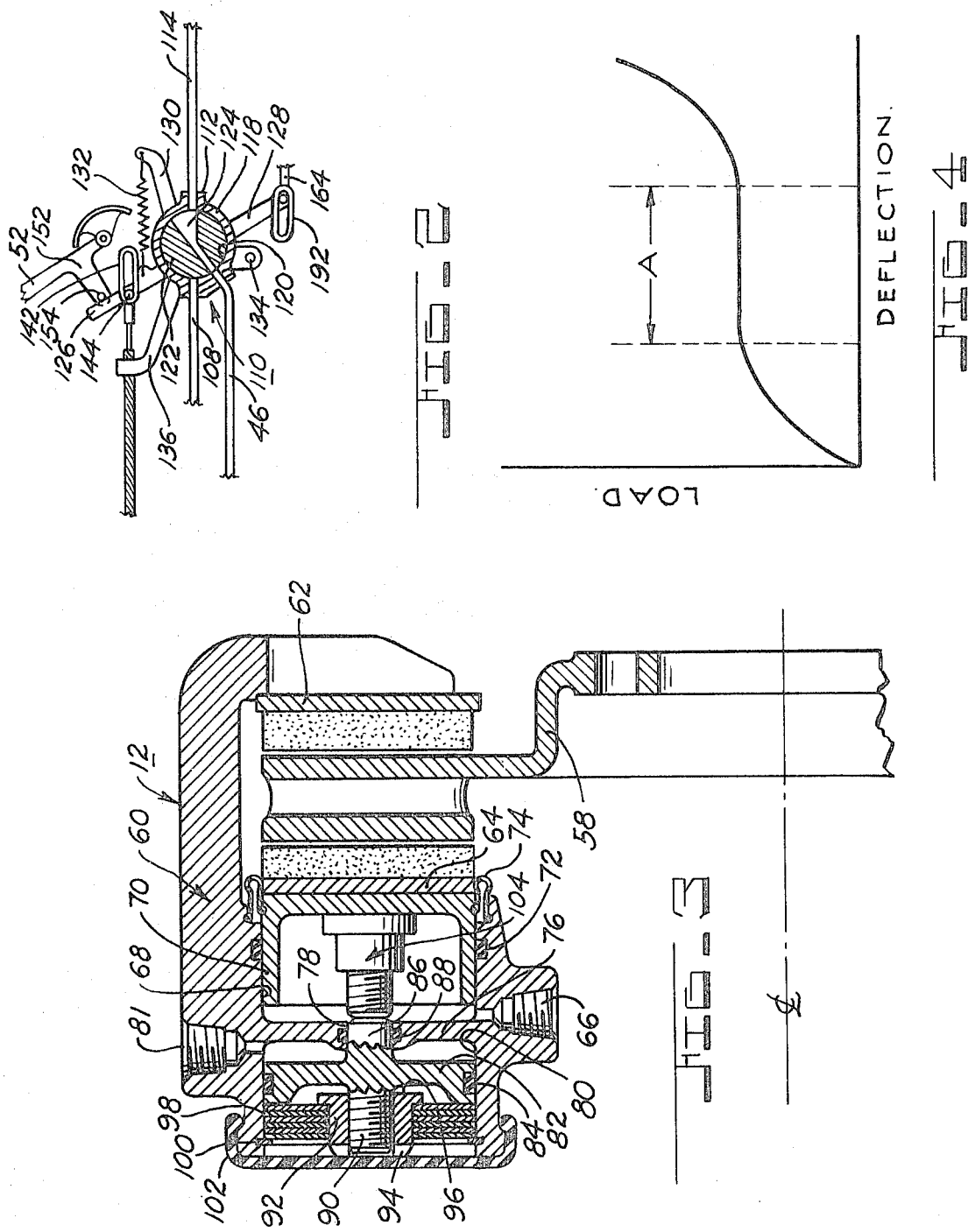

VEHICLE BRAKE SYSTEM

SUMMARY

The objects of this invention are to provide a novel disc brake having the usual hydraulic-actuated means for service braking and having, in addition, a novel system of spring actuation for parking and emergency use. A further object is the provision of a suitable brake system, including hydraulic sources, valves and the like, for facilitating the use of such brakes.

One novel feature of this system is the provision of automatic means for releasing the spring brakes after they have been used for parking, whereby the vehicle operator is protected against the possibility of operating the vehicle with the brakes partially applied, under which condition they might be damaged by overheating.

DESCRIPTION

Other objects and advantages will appear from the following description of the drawings, in which:

FIG. 1 is a diagrammatic illustration of such a system, including such parts of the automotive vehicle as are essential for the purposes hereof;

FIG. 2 shows a part of the diagram of FIG. 1 in which the emergency brake valve is shown in the actuated position;

FIG. 3 is a cross-sectional view through the caliper of a floating head caliper disc brake embodying elements of our invention; and FIG. 4 is a load deflection diagram of a typical coned washer spring commonly called a Belleville spring.

Referring now to FIG. 1, the vehicle may be provided with front disc brakes 10 of any suitable type or configuration and rear disc brakes 12, which are configured in accordance with our invention. A high-pressure hydraulic pump 14 driven by an electric motor 16 receives fluid from reservoir 18 through a conduit 19 and delivers it to an accumulator 20 through conduit 21 from which pressure fluid may be drawn for actuation of the front brakes. A similar pump 22 is equipped with a V-belt pulley 24 which is engaged with one of the several V-belts with which the vehicle engine will be equipped. This pump receives fluid from a reservoir 26 through a conduit 28 and delivers fluid under pressure to a hydraulic accumulator 30 through a conduit 32. The conduits 21 and 32 extend to the inlet ports of a dual brake valve designated generally by the numeral 34 which may be of the type illustrated in the common assignee's patent application, Ser. No. 603,851. The valve 34 is not shown in detail but consists essentially of two completely separate pressure-metering valves having in addition to the described inlet ports, outlet ports connected by conduits 36 and 38 to the wheel cylinders 40 and 42 of the front and rear brakes 10 and 12, respectively. The valve 34 also has two reservoir ports which are connected by conduits 44 and 46 to conduits 19 and 28, respectively, and thence to the reservoirs 18 and 26, respectively. Each of the valve elements of the valve 34 is actuated by a plunger, the one for the front brakes being designated 48 and the one for the rear brakes being designated 50. A brake pedal 52 has a link, designated generally by the numeral 54, which is connected to the center of a walking beam 56. The ends of the walking beam are connected to the plungers 48 and 50 in such a manner that force exerted by the driver's foot on the pedal 52 is applied to the plungers 48 and 50, thereby resulting in the application of equal pressures to the front and rear brake systems, respectively.

Turning momentarily to FIG. 3, the rear brakes 12 are provided with the usual brake discs 58 and a floating head single cylinder caliper assembly 60. The details of the mounting and floating action of this caliper may be in accordance with the common assignee's patents, for example, U. S. Pat. Nos. 3,388,774 and 3,410,371, and since they form no part of this invention, they are neither illustrated nor described. The caliper 60 is designed to apply an outer brakeshoe 62 and an inner brakeshoe 64 as a result of introducing pressure through a service brake port 66 into the cylinder bore 68 in which is mounted the usual cup-shaped piston 70. The piston is provided with the usual elastomeric seal 72 and dust shield or boot 74. The cylinder bore 68 terminates in an end wall 76 having a small diameter bore 78 concentric with the bore 68. Beyond the end wall 76 is a second emergency spring brake actuating cylinder bore 80 to which fluid may be admitted through a threaded port 81. This bore also contains a piston 82 slidable therein and sealed by means of an elastomeric seal 84. The piston 82 is formed with a rightward projection or stem 86 which passes through the wall 76 into bore 78 previously described. Another elastomeric seal 88 in wall 76 seals bores 68 and 80 from each other about this projection or pin.

The piston 82 also has a leftward pin or projection 90 which is formed with external threads which mate with internal threads in a spring adjustment bushing 92. The bushing 92 is formed at its outward end with spanner notches 94 and at its inner end is formed with flange 96. A stack of coned Belleville springs 98 is assembled between the flange 96 of the spring adjusting bushing 92 and a snapring 100 which is assembled in a suitable groove formed as an annulus near the left end of the bore 80. A cup-shaped elastomeric dust seal 102 is snapped over the end of the caliper casting to form a dirt protecting shield for the spring assembly.

Within the cup-shaped service braking actuating piston 70 is an adjuster assembly which I will designate generally by the numeral 104, which is designed and constructed in accordance with principles described in Pat. application, Ser. No. 682,846 by the common assignee.

This adjuster assembly is designed in such a way that it expands with piston motion as a result of brakeshoe lining wear and forms a comparatively rigid compression strut between the piston 70 and the stem 86 of the emergency spring brake actuating piston 82.

The operation of this novel brake is as follows. When the vehicle is to be operated, fluid pressure must be introduced to the emergency cylinder bore 80 through port 81 forcing the piston 82 to the left and flattening or compressing the coned Belleville washer until the outer margin of the piston is brought into contact with the outer margin of the innermost Belleville spring. In this condition, clearance will exist between brakeshoes 62 and 64 and the brake disc 58 so that the vehicle wheels are free to rotate. If it is then desired to apply the service brake, fluid pressure must be introduced through threaded port 66 into the service cylinder bore 68, forcing the piston 70 to move to the right and the caliper assembly 60 to move to the left so that the brakeshoes 62 and 64 are brought into contact with the brake disc, thereby generating a friction force which is transmitted to the caliper mounting elements, which, as I have explained, are not shown. The adjusting assembly 104 is provided as explained in the previously mentioned patent application with some degree of lost motion for the purpose of providing clearance upon release of the brake. However, as the linings on the brakeshoes wear, the elements of the adjuster, which consist primarily of mating external and internal threaded parts, will move relative to each other to maintain the aforesaid lost motion at a substantially constant value.

It it is now desired to apply the parking brake, it is only necessary to exhaust fluid from the emergency brake cylinder bore 80 through the port 81, allowing the coned spring pack 98 to assume its original shape, forcing the piston 82 to the right, as seen in the illustration, and causing the projection or stem 86 to bear heavily against the adjuster assembly 104, thrusting it to the right along with service brake piston 70, and also pulling the caliper 60 to the left so as to again tightly clamp the brake disc 58 between the linings on the brakeshoes 62 and 64. By rotating the bushing 92, it is possible to adjust the load exerted by the springs 98 to some predetermined level, which is preferably enough to cause a braking force to be generated which will decelerate the vehicle at a rate no less than 10 ft./sec. and which will hold the vehicle on an incline having a gradient of 30 percent.

Referring to FIG. 4, which shows a load deflection curve for one of the Belleville springs which make up the spring pack 98, it will be noted that there is a substantial range of deflection which I have included between vertical dotted lines and designated as range A in which the load does not change materially. Springs having this characteristic can be designed by adopting certain proportions in a manner well known in the art of spring design. It is a novel and useful part of our invention to adopt springs of this characteristic because of their ideal compact shape and size and also because the absence of rate over a substantial range of deflection, such as A in FIG. 4, permits a reasonable amount of variation in the performance of the automatic adjuster 104 and other elements of the brake to be tolerated without materially affecting the satisfactory function thereof.

Returning now to FIG. 1, it will be seen that the conduit 38 connected to the outlet of the rear brake valve element of the dual brake valve 34 is branched and connected to the threaded ports 66 of the two rear brake calipers 60. It will also be seen that the conduit 32 leading from the rear brake accumulator 30 to the inlet of the said rear brake element is also branched and leads through a check valve 106 to a conduit 108 which, in turn, leads to an emergency and parking brake valve which I will designate generally by the numeral 110. This valve has an outlet port 112 to which a conduit 114 is connected. The conduit 114 branches and is connected to the emergency brake ports 81 of both rear brake calipers 60.

The emergency and parking brake valve 110 is also provided with a reservoir or return port 116 to which a branch of the rear conduit 46, previously described, is connected which leads to conduit 28 and reservoir 26. For purposes of illustration only, the valve 110 is illustrated as a rotary valve made up of a housing 118 having a cylindrical bore 120 in which is rotatably mounted a valve plug 122. The valve plug 122 has formed within it a transverse passage 124 of such shape that when the plug is in one position, as seen in FIG. 1, a free and open connection is formed between conduits 108 and 114. If the plug is rotated to the position shown in FIG. 2, it will be observed that a free passage is now opened between conduits 114 and 46 and conduit 108 is blocked so that no fluid flow can occur therein.

Although not illustrated in detail, it can be understood that the plug 122 may have a stem or projection formed coaxially therewith extending through a suitably sealed opening in the housing 118. A pair of levers 126 and 128 are connected to this stem for the purpose of rotating the plug within the housing. The housing may be provided with a bracket 130 receiving one end of an extension spring 132, the other end of which is hooked into an eye formed on the lever 126 so that the spring has a tendency to urge the valve plug in a clockwise direction. An extension of the housing 118 may be provided with a pin 134 which is engaged by the lever 128 when the valve plug is in the position shown in FIG. 1. Thus, pin 134 limits the clockwise movement of the valve plug.

Another bracket 136 formed on the valve housing 118 may be formed with a clamp receiving and fixing the end of a flexible conduit 138 through which a Bowden wire 140 passes. The end of the Bowden wire 140 is provided with a fitting 142 having an elongated slot which receives a pin 144 secured to the lever 126. The conduit 138 and Bowden wire 140 extend to a position near the driver's seat, at which point the conduit 138 is provided with a suitable fitting 146 secured to the vehicle dash member 148 and the Bowden wire is provided with a switable operating knob 150. These parts are assembled in such relationship that pulling on the knob 150 will swing the lever 126 and rotate the valve plug 122 to a position shown in FIG. 2. The normal friction between the conduit 138 of the Bowden wire 140 is high enough and the force of the spring 132 is designed to be low enough so that the valve plug 122 will remain in the position of FIG. 2 once it has been moved there by operation of the knob 150.

The brake pedal 52 is provided with an extension 152 carrying a pin 154 which is supposed to also engage the lever 126 and swing it to the left to thereby move the valve plug 122 to the position of FIG. 2. When the lever is moved in this manner, the pin 144 simply slides in the elongated slot in the fitting 142 in the Bowden wire 140 and since there is no frictional effect thereby, release of the brake pedal will permit the spring 132 to restore the valve plug 122 to the position of FIG. 1.

The link, generally designated by the numeral 54, connecting the brake pedal 52 to the walking beam 56, is actually comprised of two telescoping parts 156 and 158. These two parts are urged apart by a heavy compression spring 160. A slot in member 158 receives a pin 162 installed in member 156 which limits the operating movement of the said members but permits them to telescope when a force exceeding the force of spring 160 is exerted upon the brake pedal 52. The normal actuation of the brake valve 34, by means of the pedal 52, requires a force less than that exerted by the spring 160 and the movement of the valve plungers 48 and 50 is insufficient to permit the pin 154 to engage the lever 126 and thereby operate the emergency and parking brake valve 110. However, if, as a result of failures in the hydraulic systems, insufficient braking is achieved, the vehicle operator will instinctively exert greater force upon the pedal 52 collapsing the spring 160 and causing the pedal to move a greater distance, whereby the pin 154 will engage the lever 126 and shift the plug 122 in the emergency valve 110 to the position of FIG. 2.

The end of the lever 128 has attached to it a link 164 extending from a diaphragm or piston 166 in a small vacuum actuator designated generally 168. The vacuum chamber of the actuator 168 is connected by a conduit 170 to a solenoid valve designated generally by the numeral 172. A conduit 174 extends from the vehicle engine inlet manifold 176 to the solenoid valve 172. A disc valve 178 is adapted to be translated by a magnetic core 180 between valve seats 179 and 181 in the solenoid valve 172 by means of a spring 182 or the coil 184. In the latter case the coil 184 is connected to the electrical source of the vehicle via switches 186 and 188, the former of which is the ignition switch and the latter of which is connected to the gear selector mechanism 190 for the vehicle shown in the preferred embodiment for controlling an automatic transmission (not shown). As seen in FIG. 2 the link 164 as provided has a fitting 192 which permits the lever 128 to move independently of link 164 whenever the valve plug 122 is being operated by lever 126. Therefore, spring 132 has only to be strong enough to return valve plug 122 after release of whichever of the elements 150, 152 or 168 that has been operated to move it from its normal position shown in FIG. 1 to its actuated position shown by FIG. 2.

The operation of the valve plug by motor 168 is readily appreciated to involve the solenoid valve 172. That is to say, whenever the coil 184 is deenergized as by opening the ignition switch 186 and/or the opening of switch 188 by moving the transmission selector to the park position P, disc valve will be pushed onto valve seat 179 and vacuum will be directed to the vacuum chamber to pull link 164 and rotate lever 128 counterclockwise whereupon plug valve 122 ports pressure in bore 80 to reservoir 26. Thus, Belleville springs 98 apply brake shoes 62 and 64 onto disc 58.

Having fully described an operative construction for this invention it is now desired to set forth the following claims:

I claim:

1. In a brake system having a fluid supply, a means to pressurize and store hydraulic fluid, and a control valve for monitoring delivery of the pressurized fluid to a brake actuator:

a disc brake having a common housing for first and second pistons that are operatively related via an automatic adjustment means to friction pads also supported by the housing, said first piston being positioned in said housing by spring means having a steady rate over a wide range of deflection at normal-operating fluid pressures to, in absence of fluid pressure on said piston means, operate said friction pads, said first and second pistons being connected through a wall in said housing providing therewith first and second variable volume chambers for respective first and second pistons the latter of which is connected to first conduit means from said control valve and the former of which is connected to second conduit means from the pressure source provide by the means to pressurize and store fluid from the fluid supply;

valve means in said second conduit normally permitting the communication of the first variable volume chamber and said pressure source, said valve means having a valve element for switching said second conduit means to communication with a third conduit means connected to the fluid supply whereby fluid pressure in said first variable volume chamber is relieved and said spring means can move said first piston; and means to operate said valve means.

2. The structure of claim 1 wherein said means to operate said valve means in inclusive of a foot pedal, a cable and a servomotor operatively related to each other to be ineffective on each other when controlling valve element operation.

3. In a disc brake:

a rotor having a pair of friction faces;

a torque member mounted adjacent one of said friction faces;

a caliper slidably mounted on said torque member;

said caliper including a housing disposed adjacent said one friction face, a bridge portion extending across the periphery of the rotor, and a portion extending radially inwardly adjacent the other friction face;

said housing defining a bore therewithin having an open end facing toward said one friction face;

a pair of friction elements, one of said friction elements being disposed between said one friction face and the open end of said bore and slidably carried by said torque member, the other friction element being disposed between said other friction face and said inwardly extending portion of the caliper and carried by the latter;

first piston means slidable in said bore toward and away from said open end;

second piston means slidably mounted in said bore; and resilient means operatively connected to said second piston means for urging the latter into operative engagement with said first piston means and thereafter urging said first and second piston means as a unit toward said open end, to urge said friction elements into braking engagement with their corresponding friction faces;

said second piston means cooperating with said housing to define a cavity therebetween in fluid communication with a fluid pressure source, the force of fluid pressure in said cavity acting upon said second piston means to oppose the resiliency of said resilient means to permit movement of said first piston means with respect to the second piston means as long as fluid pressure from said source is admitted into said cavity.

4. The invention of claim 3:

said housing including a wall dividing said bore into first and second compartments;

said first piston means being disposed within said first compartment and defining a fluid chamber between the other end of said piston and one side of said wall;

said second piston means being mounted in said second compartment.

5. The invention of claim 4:

said cavity being defined between the end of said second piston means and the other side of said wall.

6. The invention of claim 5:

said wall defining an opening therethrough;

said second piston means including an elongated portion extending through said opening in the wall for operative engagement with said other end of the first piston means upon evacuation of fluid pressure from said cavity.

7. In a disc brake actuator for use with a vehicle hydraulic system having a fluid pressure source:

a housing defining a bore therewithin having an open end;

first piston means slidable in said bore toward and away from said open end;

a friction element operably connected to one end of said first piston means;

second piston means slidably mounted in said bore;

resilient means operatively connected to said second piston means for urging the latter into operative engagement with said first piston means and thereafter urging said first and second piston means as a unit toward said open end;

said second piston means cooperating with said housing to define a cavity therebetween in fluid communication with said fluid pressure source, the force of fluid pressure in said cavity acting upon said second piston means to oppose the resiliency of said resilient means to permit movement of said first piston means with respect to the second piston means as long as fluid pressure from said source is admitted into said cavity;

said housing including a wall dividing said bore into first and second compartments;

said first piston means being disposed within said first compartment and defining a fluid chamber between the other end of said piston and one side of said wall;

said second piston means being mounted in said second compartment; and means for selectively admitting fluid from said pressure source into said fluid chamber for urging said piston toward said open end, said first piston means moving relative to said second piston means upon admission of pressurized fluid into said compartment; and abutment means carried on said elongated portion for engagement with said other end of the first piston means to limit retraction of the latter, said abutment means advancing on said portion toward the open end in response to wear of said friction element to limit retraction of the first piston means to a substantially constant amount.

8. The invention of claim 7:

said resilient means being a plurality of spring washers carried in said housing.

9. The invention of claim 5; and said housing having a closed end;

said second compartment being defined between said wall and the closed end;

said resilient means being disposed between the other end of said second piston means and said closed end.

10. The invention of claim 3:

said resilient means being a plurality of Belleville spring washers carried in said housing.